United States Patent Office 3,496,140
Patented Feb. 17, 1970

3,496,140
PROCESS FOR THE PREPARATION OF INTERNALLY PLASTICIZED EPOXIDE RESINS USING A POLYCARBOXYLIC ACID ANHYDRIDE MIXTURE
Manfred Dohr, Erwin Weinrich, and Manfred Budnowski, Dusseldorf-Holthausen, Germany, assignors to Henkel & Cie, G.m.b.H., Dusseldorf, Germany, a corporation of Germany
No Drawing. Filed Mar. 14, 1967, Ser. No. 622,923
Claims priority, application Germany, May 21, 1966, H 59,472
Int. Cl. C08g 45/00, 51/36
U.S. Cl. 260—47                    4 Claims

ABSTRACT OF THE DISCLOSURE

This invention relates to a process for the preparation and a product of an internally plasticized hardened epoxide resin having increased flexibility without a substantial effect on its thermal properties which comprises the steps of reacting (1) a hardenable epoxide resin containing more than one epoxide group in the molecule with (2) an acid anhydride mixture consisting of from 50% to 95% by weight of an organic polycarboxylic acid anhydride epoxide hardener and from 5% to 50% by weight of an organic polycarboxylic acid anhydride containing at least one ether oxygen, under hardening conditions and recovering said internally plasticized hardened epoxide resin. The resin is useful in the same applications as the conventional epoxide resins.

CLAIM FOR PRIORITY

Under the provisions of 35 U.S.C. 119, the right of priority is claimed, based on the corresponding German Priority Application H 59,472 IVd/39c, filed May 21, 1966.

THE PRIOR ART

Hardened synthetic resins, based on organic compounds containing more than one epoxide group in the molecule, frequently display a quite high resistance to deformation under the influence of heat. This characteristic is shown more particularly, for example, by hardened resins based on cycloaliphatic epoxide compounds or based on crystalline triglycidyl isocyanurate. On the other hand, these resins frequently do not have optimum values with regard to their mechanical properties, which are manifested in a relatively low impact strength and a low flexural strength. It is known, in general, to improve the mechanical, in particular the elastic properties, of these epoxide resins by adding softening or plasticizing agents. For this purpose so-called "external plasticizers" are considered which, however, involve certain disadvantages. More favorable results can be obtained with "internal plasticizers," for example, by an addition of reactive aliphatic carboxylic acid anhydrides containing long-chain alkyl radicals, such as polyazelaic acid polyanhydride or polysebacic acid polyanhydride.

In the case where the process of the internal plasticizing is employed in the hardening of compounds, containing more than one epoxide group in the molecule, with dicarboxylic acid anhydride or polycarboxylic acid anhydrides, a pronounced decline in the resistance to heat deformation occurs in the hardened resin with relatively small additions. This decline of thermal resistance stands in an unfavorable relation to the improvement obtained with regard to the mechanical properties. In other words, only a relatively slight improvement in the elastic characteristics is achieved with considerable loss in the thermal properties of the hardened resin.

OBJECTS OF THE INVENTION

An object of the invention is to avoid the shortcomings of the known softening processes and to establish a method which will effect a good flexibilization of the hardened epoxide resins at relatively slight losses of thermal properties.

A further object of the invention is to develop a process for the preparation of an internally plasticized hardened epoxide resin having increased flexibility without a substantial effect on its thermal properties which comprises the steps of reacting (1) a hardenable epoxide resin containing more than one epoxide group in the molecule with (2) an acid anhydride mixture consisting of from 50% to 95% by weight of an organic polycarboxylic acid anhydride epoxide hardener and from 5% to 50% by weight of an organic polycarboxylic acid anhydride containing at least one ether oxygen, under hardening conditions and recovering said internally plasticized hardened epoxide resin.

Another object of the invention is the production of a hardened epoxide resin based on the reaction of a hardenable epoxide resin containing more than one epoxide group in the molecule with an organic polycarboxylic acid anhydride epoxide hardener, having both increased flexibility and good thermal properties.

These and other objects of the invention will become more apparent as the description proceeds.

DESCRIPTION OF THE INVENTION

Lately it has been discovered that these objects can be achieved in the hardening of hardenable epoxide resins containing more than one epoxide group in the molecule with an organic polycarboxylic acid anhydride epoxide hardener in that the polycarboxylic acid anhydride is partially substituted by an ether polycarboxylic acid anhydride. Preferably, the anhydrides of polybasic carboxylic acids should be substituted with from 5% to 50%, particularly from 10% to 40%, by anhydrides of ether dicarboxylic acids.

The ether polycarboxylic acids to be used, according to the process of the invention, can contain from about 1 to 3 ether oxygen atoms, and from about 6 to 20 carbon atoms per molecule. These ether polycarboxylic acids are known compounds or compounds prepared according to known methods. The ether polycarboxylic acids can, for example, be obtained by the addition reaction of acrylonitrile with water or with bihydric or polyhydric alcohols or ether alcohols and by subsequent hydrolysis of the carboxylic acid nitriles thus formed. Prior to their use, the ether polycarboxylic acids are converted into the corresponding anhydrides, for example, by boiling with acetic acid anhydride or propionic acid anhydride.

Preferred ether polycarboxylic acid anhydrides are ether dicarboxylic acid anhydrides of the formulas:

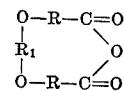

and

wherein each R represents an alkylene having from 1 to 6 carbon atoms and $R_1$ represents a member selected from the group consisting of alkylene having from 2 to 6 carbon atoms and alkoxyalkylene having from 4 to 6 carbon atoms.

Starting substances suitable for the preparation of the ether polycarboxylic acid anhydrides by the condensation of an alkenylnitrile with a dihydric alcohol and subsequent hydrolysis are, for example, ethyleneglycol, propanediol-1,2, diethyleneglycol, pentanediol-1,5, hexanediol-1,6, butanediol-1,3, etc.

The usual organic polyvalent carboxylic acid anhydrides used in the hardening of epoxy resinous compounds will serve as hardening agents for the process of the invention. For example, for this purpose the following are considered: hexahydrophthalic acid anhydride, tetrahydrophthalic acid anhydride, phthalic acid anhydride, methylcyclohexanedicarboxylic acid anhydride, dodecenylsuccinic acid anhydride, pyromellitic acid anhydride, endomethylenetetrahydrophthalic acid anhydride, methylendomethylenetetrahydrophthalic acid anhydride, etc.

The amount of the organic polycarboxylic acid anhydride epoxide hardener to be used should be such that 0.6 to 1.2, preferably 0.8 to 0.9, of carboxylic acid anhydride groups are present in the hardenable mixture for each epoxide group.

The process of the invention can be effected with known hardenable epoxide compounds containing more than one epoxide group in the molecule, for example, with glycidyl ethers of polyhydric phenols, cycloaliphatic epoxide compounds and triglycidyl isocyanurates.

The process of the invention can be carried out with glycidyl ethers of polyhydric phenols, in particular with glycidyl ethers of dihydric phenols. Especially suitable are resinous glycidyl ethers of diphenylol propane with an epoxide equivalent of 170 to about 1200, preferably about 180 to 450. Also suitable, for example, are glycidyl ethers of chlorinated, brominated, or methylated diphenylol propanes. Moreover, it is possible to use resinous glycidyl ethers of dihydric phenols such as the glycidyl ethers of hydroquinone or resorcinol. The epoxide equivalent of these resinous epoxide ethers should be between 170 and 1200.

As cycloaliphatic epoxide compounds having more than one epoxide group in the molecule for the execution of the process of the invention are considered, for example, compounds containing at least two epoxidized cyclohexene radicals in the molecule which, if so desired, can have further substitutions, for example, 3,4-epoxy-hexahydro - 6 - methyl-tetrahydrobenzyl, 3′,4′-epoxy-6′-methyl-hexahydrobenzoate or the diepoxide of the acetal of cyclohexene aldehyde and 1,1-dimethylol-cyclohexene.

In the case that the process is carried out with crystalline triglycidyl isocyanurate, this compound should have an epoxide-oxygen content of at least 14%. The preparation of such crystalline triglycidyl isocyanurates is well known as such and described in copending, commonly assigned United States Patent Application Ser. No. 292,725, filed July 3, 1963.

The hardening of the reaction mixtures is effected in the usual manner at temperatures of 80° to 200° C., particularly 100° to 180° C., over a period of from about 1 to 20 hours, particularly from 2 to 8 hours. In most cases the formation of the hardened epoxide resin is completed after this period of time. However, to be absolutely sure that the hardening process is completed, it is advisable to temper the specimens intended for test purposes for some additional time at elevated temperatures, for example, at about 150° to 210° C.

In a well known manner, dyes or fillers can be added to the mixtures prepared according to the invention, as for example, metallic powder, quartz powder, glass powder, glass fibers, mica, aluminum oxide, titanium oxide, zirconium oxide, pulverized dolomite or barium sulfate.

Since at room temperature the ether polycarboxylic acid anhydrides to be employed, according to the invention, are liquid in contrast, for example, to polyazelaic acid polyanhydride or polysebacic acid polyanhydride, extremely stable, liquid combinations can be prepared with them, utilizing epoxide resins which are also liquid at room temperatures. As mixtures of this type can be processed at a relatively low temperature, they are marked by an especially long duration of pot life before setting up. Moreover, they exhibit only an insignificant degree of shrinkage. On heating, particularly low viscous mixtures are obtained which, for example, allow the working in of a large amount of filling agents.

The process of the invention is marked by a relatively low exothermic heat reaction and thus it facilitates the preparation of molded slabs.

In comparison with the products, obtained by utilizing polyazelaic acid polyanhydride and polysebacic acid polyanhydride, the test samples prepared according to the process of the invention show superior mechanical and thermal properties.

The following specific embodiments are illustrative of the invention and will serve for better comprehension of the same. They are not, however, to be deemed limitative of the invention in any manner.

PREPARATION OF THE STARTING SUBSTANCES (I) Anhydride of HOOC—$CH_2$—$CH_2$—O—$CH_2$—$CH_2$—O—$CH_2$—$CH_2$—COOH In a two-liter, three-neck flask equipped with stirrer, reflux condenser and dropping funnel, 450 gm. of bis-[β-cyanoethyl]-glycol ether (2.7 mols) were admixed with 1000 cc. of concentrated hydrochloric acid in the space of one hour while cooling with ice water to maintain a temperature of 70° to 80° C. Then the mixture was stirred for 3 hours at a temperature of 70° to 80° C. and finally for 15 minutes at a temperature of 95° to 100° C. After the reaction mixture had been cooled to about 25° C., the precipitated ammonium chloride was filtered off and the largest portion of the water present was distilled in vacuo from the filtrate at 10 to 20 Torr. The residue was extracted three times under reflux, each time with 1 liter of acetone. After cooling the extract to room temperature, it was filtered and then the acetone was distilled therefrom. The yield in acid obtained amounted to 502 gm. (2.4 mols) with an acid number of 532 (calculated: 540).

400 gm. of the ethylenedioxy-dipropionic acid obtained were boiled under a reflux condenser with 1.2 kgm. of acetic acid anhydride for 5 hours. Thereafter, the excess acetic acid anhydride and the acetic acid formed were distilled therefrom, finishing the distillation under vacuum. To remove the last remainder of volatile constituents, the residue was passed through a thin-layer evaporator. The product, ethylenedioxy-dipropionic acid anhydride, thus obtained was dried in vacuo over solid potassium hydroxide.

(II) Anhydride of HOOC—$CH_2$—$CH_2$—O—$CH(CH_3)$—$CH_2$—O—$CH_2$—$CH_2$—COOH

As described in the preceding, 450 gm. of bis-[β-cyanoethyl]-propyleneglycol ether (2.5 mols) were hydrolized with one liter of concentrated hydrochloric acid and then worked up, thus obtaining propylenedioxy-dipropionic acid having an acid number of 505 (calculated: 510) with a yield of 489 gm. (2.2 mols).

400 gm. of the acid obtained were boiled with 1.2 kgm. of acetic acid anhydride under a reflux condenser over a period of 5 hours. Thereafter, the processing was carried out in the same manner as previously described to obtain propylene-1,2-dioxy-dipropionic acid anhydride.

(III) Anhydride of HOOC—CH$_2$—CH$_2$—O—CH(CH$_3$)
—CH$_2$—CH$_2$—O—CH$_2$—CH$_2$—COOH As previously described, 450 gm. of bis-[β-cyanoethyl]-butylene-1,3-glycol ether (2.3 mols) were converted into the free dicarboxylic acid which had an acid number of 491 (calculated: 479). The yield amounted to 484 gm. (2.1 mols).

300 gm. of the acid obtained were boiled with 900 gm. of acetic acid anhydride under a reflux condenser over a period of 6 hours, then passed through a thin-layer evaporator, after the excess acetic acid anhydride and the acetic acid had been distilled therefrom. The carboxylic acid anhydride, butylene-1,3-dioxy-dipropionic acid anhydride thus obtained was dried in vacuo for 5 hours over solid potassium hydroxide.

(IV) Anhydride of HOOC—CH$_2$—CH$_2$—O—(CH$_2$)$_6$
—O—CH$_2$—CH$_2$—COOH 450 gm. of the bis-[β-cyanoethyl]-ether of 1,6-hexanediol (2.0 mols) were hydrolyzed with 1 liter of concentrated hydrochloric acid and worked up as described in the preceding. The corresponding dicarboxylic acid was obtained with a yield of about 90% having an acid number of 439 (calculated: 428). The yield amounted to 473 gm. (1.8 mols).

400 gm. of the free acid were boiled with 1.2 kgm. of acetic acid anhydride under a reflux condenser for 5 hours. After the excess acetic acid anhydride and the acetic acid had been distilled, finishing off under vacuum, the reaction product was passed through a thin-layer evaporator and then dried over solid potassium hydroxide to obtain hexylene-1,6-dioxy-dipropionic acid anhydride.

EXAMPLES

Mixtures were prepared from various epoxide resins and from different polycarboxylic acid anhydrides. The amount of polycarboxylic acid anhydride was measured so that 0.82 mol of dicarboxylic acid anhydride were present per 1 mol of epoxide oxygen contained in the mixture. The mixtures were homogenized by melting, and molded slabs were prepared from these mixtures, measuring 10 x 15 x 120 mm. These slabs were finally hardened over a period of 3 hours at a temperature of 160° C. Each time, mixtures of about 200 gm. were used. After the hardening had been completed, the formed slabs were removed from the molds and tempered for additional 20 hours to obtain the final properties desired. The molded slabs based on epoxide resins of diphenylolpropane were tempered at a temperature of 150° C., and the other resins were tempered at a temperature of 200° C.

In the following tables, the headings indicate the epoxide resin used as well as the hardening agent. The first column gives the amount and type of the ether carboxylic acid anhydride added as indicated in the above procedures I, II, III and IV, based on the percentage of the total amount of dicarboxylic acid anhydride utilized. The following columns indicate Martens temperature in degrees centigrade, impact strength in kg. cm./cm.$^2$, deflection in mm., and flexural strength in kg./cm.$^2$. The tests for these properties were conducted according to the following DIN regulations (German Industrial Procedures): DIN 53,458, DIN 53,453 and DIN 53,452.

TABLE 1

[Example 1.—Epoxide resin based on diphenylolpropane (epoxide equivalent: 186) and phthalic acid anhydride]

| Percent ether carboxylic acid anhydride | Martens temp., °C. | Impact strength | Deflection | Flexural strength |
|---|---|---|---|---|
| 0 | 128 | 17 | 8 | 1,140 |
| 14%, II | 103 | 26 | 11 | 1,320 |
| 27%, II | 78 | 31 | 15 | 1,470 |
| 14%, III | 97 | 27 | 12 | 1,340 |
| 27%, III | 78 | 32 | 14 | 1,520 |
| 14%, I | 94 | 25 | 12 | 1,230 |

TABLE 2

[Example 2.—Epoxide resin based on diphenylolpropane (epoxide equivalent: 186) and hexahydrophthalic acid anhydride]

| Percent ether carboxylic acid anhydride | Martens temp., °C. | Impact strength | Deflection | Flexural strength |
|---|---|---|---|---|
| 0 | 108 | 20 | 11 | 1,140 |
| 14%, II | 86 | 27 | 15 | 1,390 |
| 26%, II | 66 | 38 | 18 | 1,490 |
| 14%, IV | 83 | 23 | 15 | 1,410 |
| 26%, IV | 67 | 28 | 18 | 1,530 |
| 14%, I | 84 | 28 | 14 | 1,320 |

TABLE 3

[Example 3.—Commercial triglycidyl isocyanurate (15.1% epoxide-oxygen content) and phthalic acid anhydride]

| Percent ether carboxylic acid anhydride | Martens temp., °C. | Impact strength | Deflection | Flexural strength |
|---|---|---|---|---|
| 0 | 217 | 10 | 5 | 760 |
| 12%, II | 212 | 12 | 6 | 790 |
| 25%, II | 158 | 17 | 9 | 820 |
| 12%, III | 199 | 14 | 7 | 810 |
| 24%, III | 136 | 17 | 8 | 890 |
| 14%, IV | 202 | 11 | 5 | 790 |
| 27%, IV | 137 | 15 | 6 | 870 |

TABLE 4

[Example 4.—Commercial triglycidyl isocyanurate (15.1% epoxide-oxygen content) and hexahydrophthalic acid anhydride]

| Percent ether carboxylic acid anhydride | Martens temp., °C. | Impact strength | Deflection | Flexural strength |
|---|---|---|---|---|
| 0 | 221 | 13 | 4 | 700 |
| 12%, II | 192 | 15 | 5 | 750 |
| 23%, II | 146 | 17 | 7 | 950 |

TABLE 5

[Example 5.—Commercial triglycidyl isocyanurate (15.1% epoxide-oxygen content) and methylhexahydrophthalic acid anhydride]

| Percent ether carboxylic acid anhydride | Martens temp., °C. | Impact strength | Deflection | Flexural strength |
|---|---|---|---|---|
| 0 | 210 | 12 | 4 | 600 |
| 12%, II | 187 | 14 | 5 | 690 |
| 24%, II | 136 | 16 | 7 | 820 |

TABLE 6

[Example 6.—Commercial triglycidyl isocyanurate (15.1% epoxide-oxygen content) and tetrahydrophthalic acid anhydride]

| Percent ether carboxylic acid anhydride | Martens temp., °C. | Impact strength | Deflection | Flexural strength |
|---|---|---|---|---|
| 0 | 205 | 12 | 4 | 670 |
| 12%, II | 175 | 14 | 4 | 790 |
| 23%, II | 137 | 17 | 7 | 850 |
| 12%, III | 150 | 17 | 8 | 980 |
| 23%, III | 121 | 21 | 14 | 1,120 |

TABLE 7

[Example 7.—Commercial triglycidyl isocyanurate (15.1% epoxide-oxygen content) and methylendomethylene-tetrahydrophthalic acid anhydride]

| Percent ether carboxylic acid anhydride | Martens temp., °C. | Impact strength | Deflection | Flexural strength |
|---|---|---|---|---|
| 0 | 194 | 12 | 5 | 620 |
| 14%, II | 168 | 15 | 7 | 740 |
| 23%, III | 140 | 15 | 11 | 950 |

TABLE 8

[Example 8.—Diepoxide of the acetal of cyclohexenealdehyde and 1,1 dimethylolcyclohexene and hexahydrophthalic acid anhydride]

| Percent ether carboxylic acid anhydride | Martens temp., °C. | Impact strength | Deflection | Flexural strength |
|---|---|---|---|---|
| 0 | 193 | 8 | 5 | 740 |
| 12%, III | 187 | 10 | 5 | 860 |
| 23%, III | 153 | 14 | 8 | 1,060 |
| 34%, III | 124 | 17 | 12 | 1,260 |
| 23%, I | 142 | 15 | 8 | 1,020 |
| 23%, II | 163 | 18 | 9 | 1,130 |
| 27%, IV | 141 | 14 | 7 | 980 |

TABLE 9

[Example 9.—Diepoxide of the acetal of cyclohexenealdehyde and 1,1-dimethylol-cyclohexene and methylhexahydrophthalic acid anhydride]

| Percent ether carboxylic acid anhydride | Martens temp., °C. | Impact strength | Deflection | Flexural strength |
|---|---|---|---|---|
| | 208 | 8 | 3 | 430 |
| 2%, I | 197 | 8 | 6 | 660 |
| 3%, I | 158 | 16 | 12 | 820 |
| 4%, I | 111 | 17 | 14 | 1,010 |
| 3%, II | 159 | 14 | 11 | 970 |
| 7%, IV | 122 | 16 | 13 | 1,050 |
| 3%, III | 139 | 13 | 10 | 1,020 |

The preceding specific embodiments are presented as an illustration of the invention. It is to be understood, however, that other expedients known to those skilled in the art can be employed without departing from the spirit of the invention or the scope of the appended claims.

We claim:

1. A process for the preparation of an internally plasticized hardened epoxide resin having increased flexibility without a substantial effect on its thermal properties which comprises the steps of reacting under hardening conditions (1) a hardenable epoxide resin selected from the group consisting of glycidyl ethers of polyhydric phenols, cycloaliphatic epoxide compounds, and triglycidyl isocyanurates, containing more than one epoxide group in the molecule with (2) an acid anhydride mixture consisting of from 50% to 95% by weight of an organic polycarboxylic acid anhydride epoxide hardener and from 5% to 50% by weight of an organic polycarboxylic acid anhydride selected from the group consisting of (1) compounds of the formula:

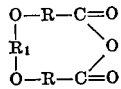

(2) compounds of the formula:

and (3) mixtures of (1) and (2), wherein each R represents an alkylene having from 1 to 6 carbon atoms and $R_1$ represents a member selected from the group consisting of alkylene having from 2 to 6 carbon atoms and alkoxyalkylene having from 4 to 6 carbon atoms; and recovering said internally plasticized hardened epoxide resin.

2. The process of claim 1 wherein said acid anhydride mixture consists of 60% to 90% by weight of an organic polycarboxylic acid anhydride epoxide hardener and from 10% to 40% by weight of an organic polycarboxylic acid anhydride containing at least one ether oxygen.

3. The process of claim 1 wherein said organic polycarboxylic acid anhydride containing at least one ether oxygen is an aliphatic dicarboxylic acid anhydride containing from 1 to 3 ether oxygens and from 6 to 20 carbon atoms.

4. The hardened internally plasticized epoxide resin having increased flexibility without a substantial effect on its thermal properties produced by the process of claim 1.

References Cited

UNITED STATES PATENTS 3,114,731  12/1963  Rumscheidt et al.

WILLIAM H. SHORT, Primary Examiner

T. PERTILLA, Assistant Examiner

U.S. Cl. X.R.

260—37, 77.5, 78.4